No. 739,403. PATENTED SEPT. 22, 1903.
J. G. EBERLE, Jr.
WIRE REELING TOOL.
APPLICATION FILED OCT. 9, 1902.
NO MODEL.
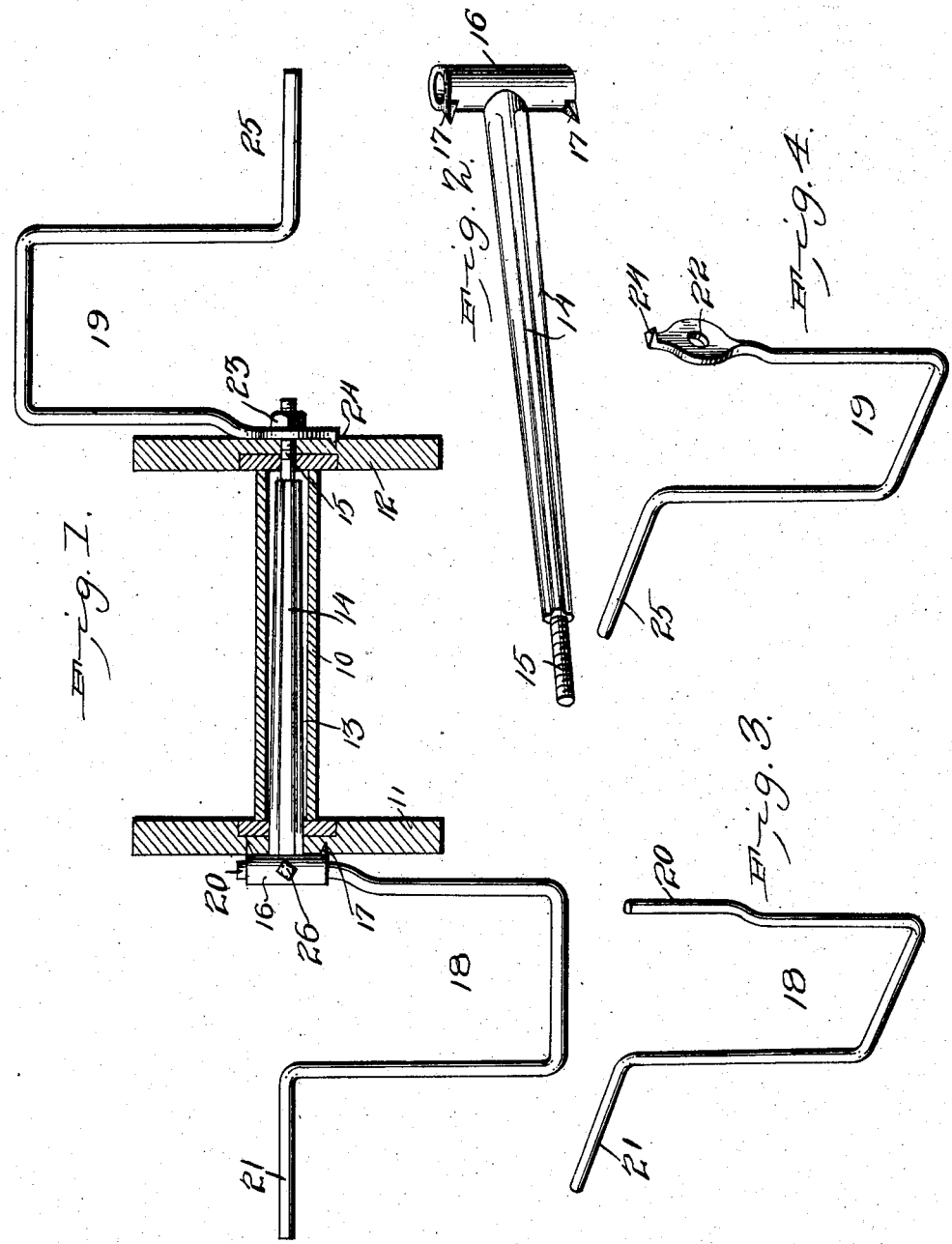
Witnesses
John G. Eberle, Jr., Inventor.
by C. A. Snow & Co.
Attorneys No. 739,403. Patented September 22, 1903.

UNITED STATES PATENT OFFICE.

JOHN G. EBERLE, JR., OF LAFAYETTE, INDIANA.

WIRE-REELING TOOL.

SPECIFICATION forming part of Letters Patent No. 739,403, dated September 22, 1903.

Application filed October 9, 1902. Serial No. 126,584. (No model.)

*To all whom it may concern:*

Be it known that I, JOHN G. EBERLE, Jr., a citizen of the United States, residing at Lafayette, in the county of Tippecanoe and State of Indiana, have invented a new and useful Wire-Reeling Tool, of which the following is a specification.

This invention relates to implements employed for the purpose of supporting reels while being wound or unwound, more particularly to the reels employed for supporting fence-wire either barbed or unbarbed, but which may be employed for holding and operating reels employed for other purposes.
The object of the invention is to produce a simply-constructed and easily-applied device whereby the reel may be supported and at the same time operated either to coil or uncoil the material; and the invention consists in a central shaft adapted to be clamped detachably to the reel and provided with reversely-disposed cranks having extensions projecting in opposite directions in longitudinal alinement with the shaft to provide means whereby two persons may support the reel and at the same time wind the material upon the reel or unwind it therefrom.

The invention further consists in certain novel features of construction, as hereinafter shown and described, and specified in the claims.

In the drawings illustrative of the invention, Figure 1 is a side elevation of the device applied to a reel, the reel being in longitudinal vertical section. Fig. 2 is an enlarged perspective view of the central shaft detached from the reel. Figs. 3 and 4 are perspective views of the two cranks detached.

The device may be applied to any of the various forms of reels and similar structures having longitudinally-disposed central apertures, but, as before stated, is more particularly applicable for supporting and operating fence-wire reels, and for the purpose of illustration the invention is shown applied to a conventional reel of this character, 10 representing the central core or drum, and 11 12 the end or journal members, the core and end members being provided with a longitudinally-disposed central aperture 13, the reel thus shown being of the ordinary construction.

The improved device consists of a central shaft 14, preferably tapered toward one end and longitudinally fluted to combine lightness with strength, as illustrated in Fig. 2. One end of the shaft 14 is screw-threaded, as at 15, and the opposite end formed with a tubular section 16, disposed at right angles to the shaft and preferably provided with inwardly-extending spurs 17 for engaging one of the end members or heads of the reel.

The shaft 14 and its members 15, 16, and 17 will preferably be formed in one piece of malleable iron, but may be formed in separate parts, if preferred.

The reversely-disposed crank members are indicated, respectively, at 18 19, the inner end 20 of the crank member 18 being preferably offset and adapted to engage the aperture in the tubular member 16, while the free end is extended, as at 21, in longitudinal alinement with the shaft 14, it being understood that when the end 20 is inserted into the tubular member 16 the end 21 will extend in longitudinal alinement with the shaft 14, as shown in Fig. 1.

The crank member 19 is preferably offset and flattened at its inner end and provided with an aperture 22, adapted to engage the threaded end 15 of the shaft 14, as indicated in Fig. 1, and held in place thereon by a nut 23. The flattened end of the crank member 19 is also provided with a spur 24, extending inwardly and adapted to engage one of the end members of the reel, while the opposite free end of the crank is extended, as at 25, in longitudinal alinement with the shaft member 14 and also with the extension 21. By constructing the reeling-tool with the crank portions disposed adjacent the reel-engaging portion thereof and between the journals 21 and 25 and said reel-engaging portion the application of power and the weight of the load are brought close together, thus preventing vibration and wabbling of the reel during operation. The crank members 18 19 will preferably be arranged extending in opposite directions, as shown in Fig. 1. By this simple arrangement the shaft 14 may be firmly clamped in position upon the reel and the crank members connected thereto, with the extended ends 21 and 25 providing supports or journals for the device, as will be obvious.

In operating the device two persons will be required, one to support the extension 21 with one hand and operate the crank 18 with the other and the other person to support the extension 25 with one hand and operate the crank 19 with the other, to either wind up the material upon the reel or to unwind therefrom, as required. Thus the reel may be operated without necessity for a supporting means other than the hands of the operators, which greatly simplifies the operation and avoids the necessity of transporting heavy and cumbersome supporting frames or trucks, and by forming the cranks intermediately of the members 18 and 19 the journal or supporting ends 21 and 25, which are held, respectively, in one hand of each of two operators, are disposed at points remote from the reel to avoid all danger of the operators coming in contact with the wire carried by the reel when winding or unwinding the wire.

With this simple device two persons can readily build a line of fence and transport all the material and without danger of injury to themselves from the barbs on the wire, when barbed wire is employed, or injury to the wire, as the reels with the wire thereon may be readily transported without the hands of the operators coming in contact with the wire or the wire coming in contact with the ground, as the reels may be lifted and carried by the attachment, as will be obvious.

All of the parts forming the improved device may be constructed of metal, the handle members preferably of steel and the shaft member, with its tubular head 16, preferably of malleable iron, as heretofore noted.

The threaded end 15 will preferably be of iron or steel and cast into the shaft member 14 in the ordinary manner.

Some simple means, such as a set-screw 26, may be employed, if required, to secure the end 20 of the handle member 18 in the tubular section 16; but any other suitable attachment may be employed for this purpose, if preferred.

The device may be modified in minor particulars to adapt it to reels of different sizes and employed for different purposes, and I hereby reserve the right to such alterations and modifications as may come within the scope of the claims for the purpose of thus adapting the device to the different sizes of reels to which it may be applied.

Having thus described the invention, what is claimed is—

1. A reel-operating device having a shaft screw-threaded at one end and provided with an enlargement at the other end, a crank member detachably engaging said enlargement, a crank member movably engaging said threaded end, and a nut engaging said threaded end outside said crank member.

2. In a device of the class described, a shaft screw-threaded at one end and having a transversely-disposed tubular head at the other end, a crank member detachably connected to said tubular head, and a crank member adjustably connected to the threaded end of said shaft, substantially as described.

3. In a device of the class described, a shaft having a transversely-disposed tubular head at one end, a crank member adjustably connected to said central shaft at the other end, and a crank member detachably connected to said tubular head, substantially as described.

4. In a device of the class described, a shaft having a tubular head at one end, a crank member adjustably connected to said shaft at the other end and having an extension in longitudinal alinement with said shaft, and a reversely-disposed crank member detachably connected to said tubular head and provided with an extension in longitudinal alinement with said shaft, substantially as described.

5. In a device of the class described, a shaft, a crank member detachably connected to one end of said shaft and having an extension in longitudinal alinement therewith, a reversely-disposed crank member adjustably connected to the opposite end of said shaft and having an extension in longitudinal alinement with said shaft, substantially as described.

6. A reel-operating device comprising a shaft having at one end an enlargement integral therewith and provided with inwardly-extending spurs, a crank member detachably connected to said enlargement, a crank member adjustably connected to the other end of said shaft and provided with an inwardly-extending spur.

7. A reel-operating device comprising a shaft having a transversely-disposed tubular head at one end with spurs extending inwardly therefrom, a crank member detachably engaging said head, a reversely-disposed crank member adjustably engaging the opposite end of said shaft and provided with inwardly-extending spurs.

8. In a device of the class described, a shaft screw-threaded at one end and having a transversely-disposed tubular head at the other end with inwardly-extending spurs thereon, a crank member adjustably engaging said tubular head, a reversely-disposed crank member movably engaging the threaded end of said shaft and having an inwardly-extending spur, and a nut engaging said threaded end outside said reversely-disposed crank member, substantially as described.

9. In a device of the class described, a shaft screw-threaded at one end and having a tubular head at the other end, a crank member detachably engaging said tubular head and provided with an extension in longitudinal alinement with said shaft, a reversely-disposed crank member movably engaging said threaded end and provided with an extension in longitudinal alinement with said shaft, and a nut engaging said threaded end outside of said reversely-disposed crank member, substantially as described.

10. In a device of the class described, the combination of a reel having a longitudinal central aperture, a shaft engaging said aperture and threaded at one end and provided with an enlargement having inwardly-extending spurs at the other end and engaging said reel, a crank member detachably engaging said enlargement, and a reversely-disposed crank member movably engaging said threaded end and having an inwardly-extending spur engaging said reel, and a nut engaging said threaded end, whereby said shaft and crank members are detachably clamped to said reel, substantially as described.

11. In a device of the class described, the combination of a reel having a longitudinal central aperture, a shaft engaging said aperture and threaded at one end and provided with an enlargement at the other end and engaging said reel, a crank member detachably engaging said enlargement and extended in longitudinal alinement with said shaft, a reversely-disposed crank member movably engaging said threaded end and clamped upon said reel by a nut and having an extension in longitudinal alinement with said shaft, substantially as described.

In testimony that I claim the foregoing as my own I have hereto affixed my signature in the presence of two witnesses.

JOHN G. EBERLE, JR.

Witnesses:
W. S. POTTER,
P. T. POTTER.